(12) United States Patent
Enis et al.

(10) Patent No.: US 9,650,260 B2
(45) Date of Patent: May 16, 2017

(54) DESALINATION METHOD AND SYSTEM USING A CONTINUOUS HELICAL SLUSH REMOVAL SYSTEM

(76) Inventors: Ben M. Enis, Henderson, NV (US); Paul Lieberman, Torrance, CA (US)

(*) Notice: Subject to any disclaimer, the term of this patent is extended or adjusted under 35 U.S.C. 154(b) by 823 days.

(21) Appl. No.: 12/309,730

(22) PCT Filed: Jul. 24, 2007

(86) PCT No.: PCT/US2007/016765
§ 371 (c)(1),
(2), (4) Date: Sep. 17, 2009

(87) PCT Pub. No.: WO2008/013870
PCT Pub. Date: Jan. 31, 2008

(65) Prior Publication Data
US 2010/0018247 A1    Jan. 28, 2010

Related U.S. Application Data

(63) Continuation-in-part of application No. 11/731,717, filed on Mar. 30, 2007, now Pat. No. 8,863,547.

(60) Provisional application No. 60/832,777, filed on Jul. 24, 2006.

(51) Int. Cl.
| | |
|---|---|
| *C02F 1/22* | (2006.01) |
| *B01D 9/00* | (2006.01) |
| *C01D 9/00* | (2006.01) |
| *C02F 1/10* | (2006.01) |
| *C02F 1/12* | (2006.01) |
| *C02F 103/08* | (2006.01) |

(52) U.S. Cl.
CPC .............. *C02F 1/22* (2013.01); *C02F 1/10* (2013.01); *C02F 1/12* (2013.01); *C02F 2103/08* (2013.01); *C02F 2209/02* (2013.01); *C02F 2209/03* (2013.01); *C02F 2303/16* (2013.01); *C02F 2303/26* (2013.01); *Y02W 10/37* (2015.05)

(58) Field of Classification Search
CPC ...... C02F 1/10; C02F 1/12; C02F 1/18; C02F 1/22; C02F 2103/08; C02F 2209/03; C02F 2303/16; C02F 2303/26; C02F 2209/02; Y02W 10/37
USPC .... 62/532, 123, 347, 320, 348; 34/304, 368; 165/157, 168
See application file for complete search history.

(56) References Cited

U.S. PATENT DOCUMENTS

| | | | |
|---|---|---|---|
| 1,970,437 A | | 8/1934 | Snitkin |
| 1,976,204 A | * | 10/1934 | Voorhees et al. .......... 62/74 |
| 1,999,712 A | | 4/1935 | Zorn et al. |

(Continued)

*Primary Examiner* — Mohammad M Ali
(74) *Attorney, Agent, or Firm* — Garrett James O'Sullivan

(57) ABSTRACT

The invention relates to a desalination method and system that uses freeze crystallization technology that incorporates the use of compressed air energy as the source for freezing temperatures. When compressed air is released by a turbo expander, chilled air is produced as a by-product, wherein the chilled air is introduced into a chamber, wherein a spray cloud of seawater droplets, which has been pre-chilled by heat exchange with the cold chamber walls, is then circulated and exposed to the chilled air in the chamber. The droplets then settle at the bottom of the chamber, wherein they are deposited at slightly above the eutectic temperature, to form an ice/brine slush mixture. A slush removal mechanism with a screw-like helical blade is provided to continuously remove the ice particles from the chamber.

24 Claims, 5 Drawing Sheets

(56) References Cited

U.S. PATENT DOCUMENTS

| | | | | |
|---|---|---|---|---|
| 2,637,177 | A | * | 5/1953 | Reedall .................. 62/532 |
| 2,885,431 | A | * | 5/1959 | Tarr ...................... 560/78 |
| 2,890,239 | A | * | 6/1959 | Quigg .................... 560/78 |
| 3,017,752 | A | * | 1/1962 | Findlay .................. 62/535 |
| 3,052,557 | A | * | 9/1962 | Vidal et al. ............. 426/522 |
| 3,251,192 | A | | 5/1966 | Rich et al. |
| 2,988,895 | A | | 6/1966 | Toulmin |
| 3,342,039 | A | | 9/1967 | Bridge et al. |
| 3,404,536 | A | | 10/1968 | Aronson |
| 3,440,147 | A | | 4/1969 | Rannenberg |
| 3,443,393 | A | | 5/1969 | Goldberg |
| 3,461,679 | A | | 8/1969 | Goldberger |
| 3,733,029 | A | * | 5/1973 | Eustis et al. ............ 239/14.2 |
| 3,817,051 | A | * | 6/1974 | Seliber .................. 62/123 |
| 3,874,559 | A | * | 4/1975 | Pink ..................... 222/146.6 |
| 4,112,702 | A | | 9/1978 | Smirnov et al. |
| 4,192,151 | A | * | 3/1980 | Carpenter ................ 62/320 |
| 4,634,315 | A | * | 1/1987 | Owen et al. ............. 405/217 |
| 4,666,484 | A | * | 5/1987 | Shah et al. .............. 62/532 |
| 4,749,394 | A | | 6/1988 | Ehrsam |
| 4,948,514 | A | | 8/1990 | MacGregor et al. |
| 5,025,641 | A | * | 6/1991 | Broadhurst ............... 62/347 |
| 5,655,386 | A | * | 8/1997 | Huang et al. ............. 62/320 |
| 6,076,364 | A | * | 6/2000 | Stripp ................... 62/123 |
| 6,336,334 | B1 | | 1/2002 | Minkkinen et al. |
| 2005/0138929 | A1 | * | 6/2005 | Enis et al. .............. 60/641.8 |

\* cited by examiner

DESALINATION METHOD AND SYSTEM USING A CONTINUOUS HELICAL SLUSH REMOVAL SYSTEM

RELATED APPLICATIONS

This application is a continuation in part of U.S. application Ser. No. 11/731,717, filed Mar. 30, 2007 now U.S. Pat. No. 8,863,547, which claims the benefit of the filing date of U.S. provisional application Ser. No. 60/832,777, filed Jul. 24, 2006.

FIELD OF THE INVENTION

The present invention relates to the field of desalination systems, and in particular, to a desalination method and system that uses a compressed air energy system to produce an ice/brine mixture at the bottom of a crystallization chamber, wherein a helical slush removal system is provided to enable the ice particles to be removed from the chamber on a continuous basis.

BACKGROUND OF THE INVENTION

In the United States, there is typically an adequate supply of fresh drinking water available in most regions of the country. Even in areas where water supplies are scarce, efforts have been made to transport water from where it is available, to where it is needed. For example, a significant amount of water is currently being transported from the Colorado River, via the California Aqueduct, to heavily populated, but dry, regions of Southern California, so that sufficient water will be available, not only for drinking purposes, but for agriculture and irrigation. Other means of supplying and transporting water, such as through a network of utilities, and pipelines, including those from lakes, reservoirs, rivers, glaciers, etc., are also in existence.

Nevertheless, there are many geographical areas throughout the country and world where fresh drinking water is not readily available, or where it might be inconvenient or cost prohibitive to transport the water to where it is needed. These areas include mountainous regions, rural areas, islands, etc. There are also large population centers near the coastline, such as in dry or arid climates, where there is sufficient seawater, but not enough drinking water available to support the population.

Accordingly, desalination systems and methods to produce fresh drinking water from seawater have been developed in the past. The key to any desalination system is the ability to separate the contaminants, including salt and other impurities, from the base water, which in turn, can produce fresh drinking water. For purposes of simplicity, the term "seawater" will be used herein to refer to any contaminated water that needs to be purified, whether it is actually water from the sea, or water from any other source.

At least three different types of desalination systems are currently in use today, to varying degrees of success, including 1) the thermal method, which uses heat or other means to convert seawater into water vapor, such as by boiling, 2) the membrane method, which uses a relatively thin permeable layer of material to separate the water from the salt, and 3) the freeze crystallization process, which takes advantage of the freezing process and the phase diagram of seawater to produce fresh drinking water.

The present invention is utilized in conjunction with a variation of the freeze crystallization process. The freeze crystallization process is different from other processes in that seawater is subjected to cooling temperatures, such as via a refrigerant, which causes the seawater to freeze, wherein the freezing is used to help form solid ice crystals made from pure water, which can then be separated from the salt contaminants contained in the residual base water.

Because of the drawbacks of existing desalination methods and systems, however, there is a need for a highly efficient and cost effective desalination system that allows fresh drinking water to be produced from seawater on a continuous basis.

SUMMARY OF THE INVENTION

The present invention facilitates the continuous removal of ice crystals in conjunction with the use of a desalination system that uses a compressed air energy system to freeze the seawater and form a slushy ice/brine mixture at the bottom of a crystallization chamber. Preferably, the desalination system incorporates a compressed air energy system, wherein compressed air is released to produce chilled air as a by-product, which can then be introduced into the crystallization chamber, and used to flash freeze seawater droplets that are sprayed into the crystallization chamber. Rather than using a refrigerant to reduce the temperature of the seawater for desalination purposes, as in the case of past freeze crystallization methods, the present invention preferably uses clean chilled air, derived from releasing and expanding compressed air energy, directly mixed with the seawater droplets, to produce frozen ice particles to desalinate seawater.

The desalination system generally comprises the following steps:

1. Producing a volumetric flow of chilled air at temperatures as low as about minus 80 degrees C. or minus 175 degrees F. at slightly above one atmosphere of pressure, and introducing this chilled air into an insulated crystallization mixing chamber. This chilled air can be produced by using a turbo expander to expand compressed air, or through a turbo expander and generator that jointly produces electricity and chilled air as a by-product.

2. Producing a volumetric flow of seawater which can be sprayed as a droplet cloud into the chamber and mixed with the chilled air to cause the temperature of the seawater droplets to be reduced to at or slightly warmer than the eutectic temperature, which, for regular seawater, is about minus 21.2 degrees C. or minus 6.2 degrees F. In this respect, the system can be arranged so that the seawater is pre-cooled before it is sprayed into the chamber, which can be accomplished by running seawater through pipes and/or cavities that wrap around the crystallization chamber, wherein the cold temperature in the chamber can be used via heat exchange to cool the seawater before it is introduced into the chamber.

3. As the seawater droplets begin to mix with the chilled air, and flash freeze, due to heat exchange, pure water ice crystals begin to form, which begin to separate from the salty brine solution around each droplet. Over time, i.e., less than a few seconds, ice begins to form and separate from the concentrated brine, which becomes more concentrated as more ice forms. These partially frozen ice particles then begin to fall to the bottom of the chamber, where they collect to form an ice/brine slush mixture.

4. The system preferably maintains the temperature of the slush mixture at slightly above the eutectic temperature, so that the mixture remains wet and slushy, and does not freeze or form salt crystals. It is this slushy ice/brine mixture that the present invention is designed to continuously remove from the bottom of the crystallization chamber, without having to stop the freeze crystallization process each time a sufficient amount of slush has been produced.

The desalination system of the present invention preferably comprises a crystallization mixing chamber, wherein seawater and chilled air are intermixed within the chamber. The seawater is preferably pressurized and passed through an array of nozzles to form a spray of seawater droplets. By injecting the chilled air into the mixing chamber so that the seawater droplets are exposed to and circulated by the chilled air, ice crystals will begin to form within each droplet.

To efficiently control the temperature of the chamber, the chamber walls are preferably provided with tubes and/or cavities that wrap around the crystallization chamber, such that the seawater can be distributed through it. This helps to regulate the temperature of the chamber, but also helps to pre-cool the seawater to near freezing temperatures before it enters the chamber, so that once it enters the crystallization chamber, it will freeze more quickly. Waste heat from the compressor can also be used for a similar effect, i.e., distributed through pipes and/or cavities wrapped around the crystallization chamber, which helps to prevent ice particles from sticking and collecting to the chamber walls. This also acts as a heat exchanger, so that the heated air from the compressor is pre-cooled before it is sent to the turbo expander and expanded to produce chilled air.

Desalination occurs because the seawater is chilled to near its eutectic temperature (about minus 21.2 degrees C.), and separates into solid ice (frozen fresh water) and liquid brine (highly concentrated salt solute in water solvent), where the formation of the ice crystal forces the saltwater out of its structure. In this respect, the freezing of the seawater preferably occurs in two stages: (1) chilling of the filtered seawater pumped through tubes or cavities surrounding the chilled crystallization walls (strong chilling effect), and (2) chilling of the seawater droplets during their flight through the chilled air in the chamber (short residence time with chilling of the droplet).

The slush mixture is preferably removed from the chamber in the following manner:

A continuous ice removal system has been developed using a horizontally oriented helical screw-like blade member located at the bottom of the chamber that can operate continuously. The mechanism has a blade that rotates to cause ice particles that form at the bottom of the chamber to laterally travel through an opening in the exit chamber at the bottom of the main chamber. This requires the ice particles to form as more a slush, rather than as a hard ice block, so that it does not stick to the blade, and so that it can easily be pushed sideways.

One of the problems addressed by the present invention is how to keep the slush mixture moving continuously through the opening in the main chamber, while at the same time, maintaining pressure within the main chamber to force the slush out. If pressure is added to the main chamber, but the chamber is not sealed, the air will simply pass through the opening, and pressure inside won't build up.

The problem is solved as follows: The slush is preferably formed so that it is virtually air-impervious, i.e., the slush is preferably wet and comprised of tiny ice particles and liquid salt brine attached to the ice particles, to form a slush-like consistency. This way, as the slush is being forced laterally toward the opening by the action of the blade and air pressure within the crystallization chamber is increased, the slush will fill the annulus volume within the blade, so that as the slush is being passed through, the slush will seal the exit chamber, and prevent the venting of pressurized air through the exit point. The blade is also preferably sealed around the edges, flush with the exit chamber, which can be accomplished by using containment walls, such as made of brass, that are flush and tight-fitting with the external shape of the blade. That way, by filling the blade and filling the voids or gaps therein with slush, the bottom exit chamber can effectively be sealed thereby, but without preventing the slush from passing out through the exit point.

An additional problem addressed by the present invention relates to the start up phase, when the slush has yet to fill the blade completely, and pressure is needed in the main chamber to fill the voids or gaps therein. This problem is addressed with a start-up configuration, which begins with the exit chamber sealed at the end thereof, and a trap door for allowing ice particles to be removed closed, but with a small vent capable of allowing trapped air out. This way, when the system is initially turned on, the pressure inside the main chamber can be increased and maintained, sufficient to enable the slush to begin flowing and filling the voids or gaps within the blade. Then, once the slush has filled the voids and gaps, i.e. to create an air-impervious barrier around the opening, the trap door can be opened which allows the ice particles to start flowing out of the exit chamber, i.e., through the exit point, while at the same time, the slush remains enveloped around the blade within the opening, to seal the exit chamber. The slush preferably prevents the passage of air through the opening, while at the same time, the slush is able to move laterally downstream through the exit chamber to the exit point, where the ice particles can drop down into an ice crystal collection vessel, and/or conveyor where it can be removed and allowed to melt.

A side chamber is preferably provided next to the main chamber through which the chilled air in the main chamber can exit. The configuration of the side chamber preferably causes the chilled air to "turn the corner" at the bottom of the main chamber, such that the air travels sideways, and then passes upward through the side chamber, and out, while the seawater droplets are deposited at the bottom of the main chamber. This preferably causes the small seawater droplets to be deposited onto the bottom of the main chamber, which also helps to push more of the slush down and laterally toward the opening, and helps prevent the air stream from interfering with the falling droplets.

As the blade rotates, and the slush moves laterally through the exit chamber, the salt brine preferably begins to separate from the ice particles, and is allowed to collect and flow down a drain located at the bottom of the exit chamber preferably downstream from the opening. The blade tends to break up the ice formation and facilitates the drainage of the brine solution. The downstream location of the drain preferably ensures that the liquid brine does not separate from and drain out of the slush pre-maturely, but is allowed to mix and remain part of the slush near the main chamber opening where the slush remains air-impervious to seal the opening.

As the blade continues to move the slush through the exit chamber and toward the exit point, and more and more of the salt brine is drained from the slush mixture, the slush mixture preferably begins to consist of mostly pure ice particles, along with a few tiny air pockets and bubbles where the salt brine used to be. That is, by the time the slush moves all the way to the exit point, the mixture is preferably mostly "dry," with little or no liquid salt brine mixed in with the ice particles. At this point, the ice particles are pushed by the blade through the exit chamber, and the ice particles are allowed to drop down through the exit point, where the trap door is located, and into an ice collection vessel, or onto a conveyor, which transports the ice particles to where they can be melted to form pure water.

Because the ice mass is made of ice, and therefore, is cold, the fresh water that is produced when it melts will be chilled water. From there, the fresh chilled water can be distributed for drinking purposes, or used for other purposes, such as being stored for later use by the air conditioning system

DETAILED DESCRIPTION OF THE INVENTION

Figure 1:
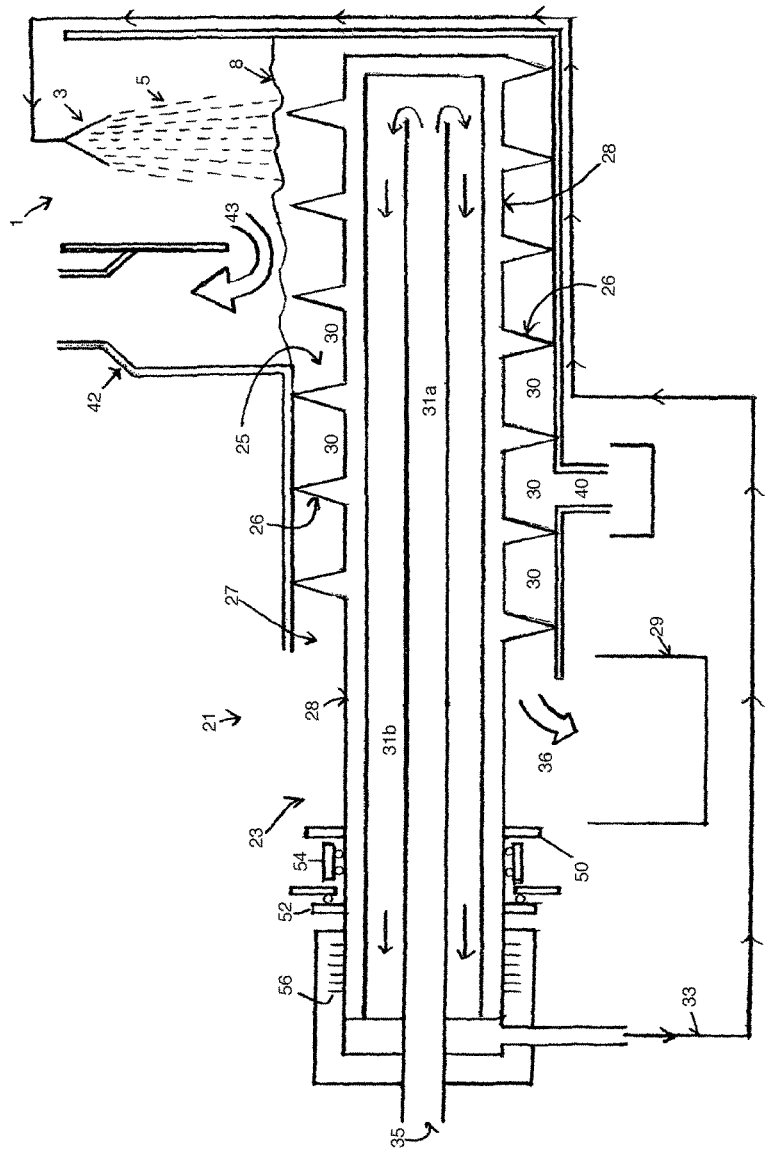
FIG. 1 is a section side view of the continuous ice removal system of the present invention showing the crystallization chamber on the right side, with a spray for spraying the seawater droplets, and an injection for the chilled air, and a continuous rotating shaft with helical screw-like blade for removing the ice, extending horizontally along the bottom through a lower horizontal opening.

As shown in FIG. 1, the desalination system of the present invention preferably comprises an insulated crystallization mixing chamber 1, wherein seawater and chilled air can be intermixed therein. This chamber 1 and side chamber 42 are not shown to scale in FIG. 1. The lower section of chamber 1, which comprises the slush removal system of the present invention, will be discussed in more detail below.

At the top of chamber 1, there is preferably a nozzle or an array of nozzles 3 that can form a spray of seawater droplets 5 into chamber 1. The nozzle 3 preferably produces a volumetric flow of seawater which can be sprayed as a droplet cloud 5 into chamber 1, as shown. The desalination system preferably pressurizes and filters the seawater before it is passed through nozzle 3 into chamber 1.

The preferred embodiment uses a compressed air energy system to produce chilled air which is introduced into chamber 1 and used to flash freeze the droplets 5. The chilled air is preferably introduced at the top of chamber 1, such that it interacts with the falling seawater droplets 5, and preferably causes the temperature of the droplets 5 to be reduced to at or slightly warmer than the eutectic temperature, which, for regular seawater, is about minus 21.2 degrees C. or minus 6.2 degrees F. The volumetric flow of chilled air can enter into chamber 1 from above 4, as shown in FIG. 5, preferably at temperatures as low as about minus 80 degrees C. or minus 175 degrees F. at slightly above one atmosphere of pressure.

This chilled air can be produced by using a turbo compressor 9 to compress the air, and a turbo expander 7 to expand the compressed air, whether by itself, or in conjunction with a generator that jointly produces electricity and chilled air as a by-product. Compressed air can also be stored and released using turbo expander 7. Rather than using a refrigerant to reduce the temperature of the seawater for desalination purposes, as in the case of past freeze crystallization methods, the present invention uses clean chilled air derived from releasing and expanding compressed air energy. By introducing the chilled air into chamber 1 so that the seawater droplets 5 are exposed to and circulated by the chilled air, ice crystals will begin to form within each droplet 5.

In this respect, the volumetric size of each seawater droplet 5 and the temperature of the seawater and chilled air are preferably predetermined, as well as the overall size and configuration of chamber 1. Also preferably predetermined is the manner in which the seawater spray and chilled air are injected into chamber 1, and mixed, to ensure that the resultant mixture quickly reaches the optimum temperature for freezing and desalination purposes. The chilled air can be injected upward to create a counter flow, or downward to create a co-flow scenario, but is preferably injected downward in the same direction as the seawater droplets 5, as shown in FIG. 5.

Figure 5:
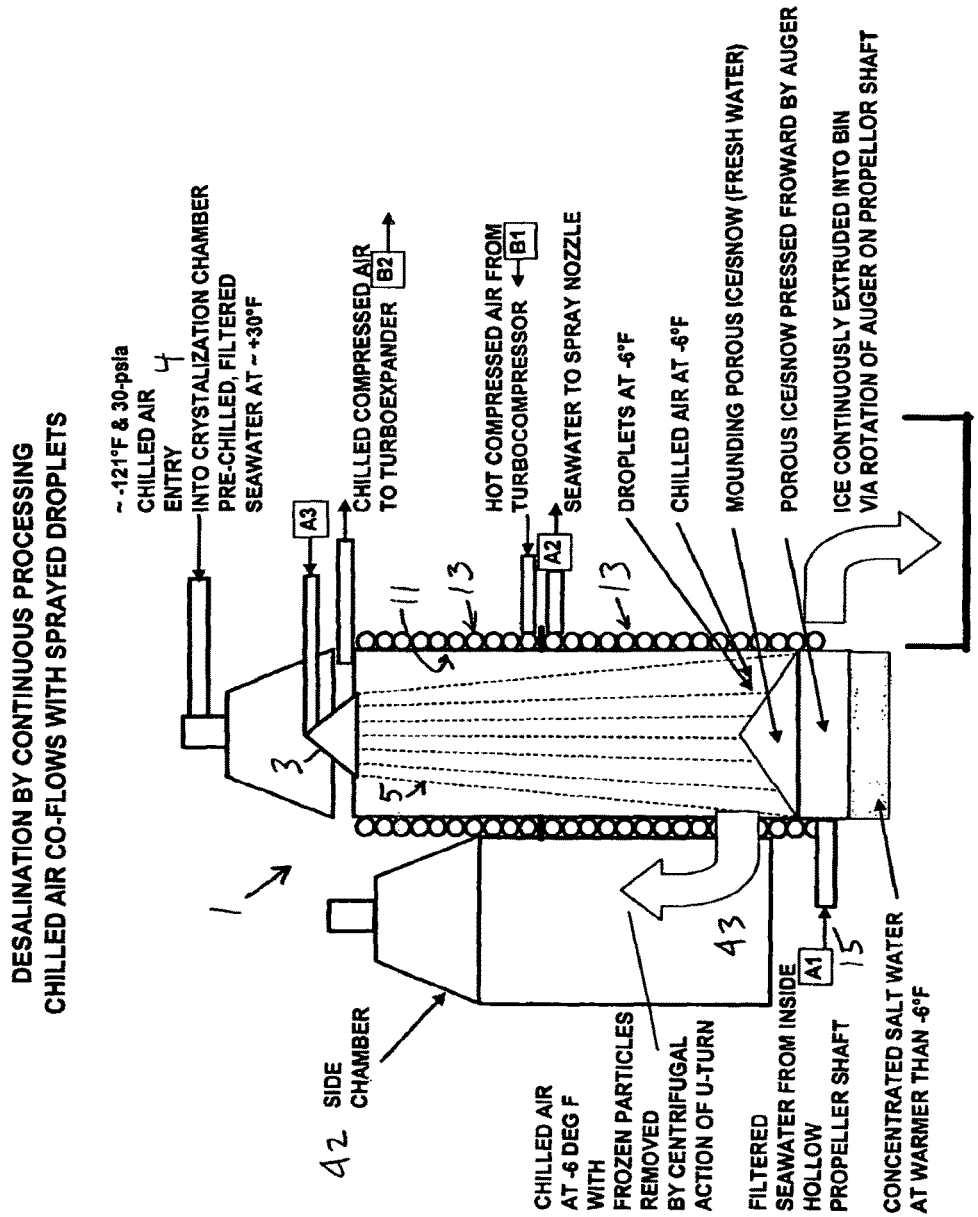
FIG. 5 shows a section view of the main and side chambers of FIG. 1 with the pipes and/or cavities extending around the walls thereof for circulating seawater and/or heated compressed air through the chamber walls.

To efficiently control the temperature of chamber 1, the chamber walls 11, as shown in FIG. 5, are preferably heated with the indrawn warm seawater and/or heated compressed air from the compressor 9 to keep the ice from collecting on walls 11, and sticking thereto. In addition to the heat exchange that occurs to regulate the temperature of the chamber walls 11, when indrawn seawater is passed through the chamber walls, as will be discussed, it helps to pre-cool the seawater before it is sprayed into chamber 1, and, when compressed air is used to regulate the chamber temperature, it helps to pre-cool the air before it is expanded by turbo expander 7.

Preferably, when seawater is used, the seawater is filtered, and pressurized, and then fed into tube 15, shown in FIG. 5, wherein the seawater is preferably distributed through tube 13 that wraps around the perimeter of crystallization chamber 1. Tubes 13 can be used, or the chamber wall 11 can be formed with a cavity in between, such as a double wall system with dividers. In this manner, in addition to regulating the temperature of chamber 1, the seawater can be pre-cooled by heat transfer, such that, once it enters crystallization chamber 1, it will freeze more quickly. Preferably, the temperature of the seawater before it enters into chamber 1 can be close to freezing or even slightly colder than the freezing point of distilled water (0° C. or 32° F.).

Waste heat from the compressor 9 can also be used for a similar effect. That is, around the crystallization chamber 1, it may be desirable to prevent ice particles from sticking and collecting to chamber walls 11, and therefore, one way to use the waste heat from compressor 9 is to distribute the heated compressed air, or warm water produced by the waste heat, within a tube 13 and/or cavity extending around chamber 1. This also acts as a heat exchanger, so that the heated air from compressor 9 can be pre-cooled before it is sent to turbo expander 7, such that air released by turbo expander 7 can be made even colder, more efficiently.

Heat transfer causes the hot compressed air to cool down by the time it passes through pipe 13 surrounding the cold main crystallization chamber 1. The cooled compressed air is expanded by a turbo expander 7 to create super chilled air that is introduced into main chamber 1. Thus air is pressurized, cooled, and passed through a turbo expander 7 for further cooling so that there is continuous flow of super chilled air to freeze the seawater droplets 5 in main chamber 1. This also enables the compressed air to be stored in pipes, in a substantially "tank-less" system.

The warmer temperature of the seawater and/or heated air helps to keep ice from collecting on the walls of the chamber, and regulate the temperature inside the chamber, to maintain a consistent temperature therein. At the same time, the heat transfer from the cold temperature inside the chamber to the pipes and/or cavities surrounding the chamber helps to cool the seawater and/or heated air, which helps to pre-cool the seawater before it is sprayed into the chamber, and/or pre-cool the heated air before being chilled by the turbo expander and introduced into chamber 1. Preferably, much of the pre-cooling of the seawater occurs when it is in the tubes/cavities and there is thereby an excellent means of transferring heat from the seawater and compressed air into the chamber walls and chamber air.

FIG. 5 shows the heated compressed air distributed around the top half of chamber 1, whereas the warm seawater is shown to be distributed around the bottom half of chamber 1. Nevertheless, in an alternate embodiment, heated air can be distributed around the bottom half, and seawater can be distributed around the top half.

Desalination occurs because the seawater is chilled to near its eutectic temperature (about minus 21.2 degrees C.), and separates into solid ice (frozen fresh water) and liquid brine (highly concentrated salt solute in water solvent), where the formation of the ice crystal forces the saltwater out of its structure. In this respect, the freezing of the seawater preferably occurs in two stages: (1) chilling of the filtered seawater pumped through tubes 13 and/or cavities surrounding the chilled crystallization walls 11 (strong chilling effect), and (2) chilling of the seawater droplets 5 during their flight through the chilled air in chamber 1 (short residence time with chilling of the droplet 5).

During the downward flight of the droplets 5 through the chilled air, each droplet begins to get colder progressively inward toward its center, and eventually, ice crystals begin to form within the shell of the droplet. Typically, the freezing occurs from the outside to the inside, but over time, the ice structure that is formed forces the saltwater brine to the outside, i.e., brine rejection. It has also been observed that any ice shell that forms around the concentrated brine core develops internal stresses and fragments and forces the concentrated liquid brine to the outside of the ice shell. When these coated ice crystals impinge on each other, the brine solution is forced to surround the newly formed ice crystal composite. This process continues until there is a complete separation of a macrostructure of ice surrounded by brine.

In one example, droplets 5 that are greater than 4,000-microns in diameter may have an interior core portion that is not yet frozen, and droplets that are less than 200 microns in diameter may be completely frozen through to its center. It has been observed that even if all droplets are the same size, some will freeze late and some will freeze early because of the process of how ice forms around a microscopic nuclei that varies in number and size, in each droplet of the same size.

It is important for the droplets 5 to freeze to form a two-phase solution of solid ice particles and liquid brine, so it is desirable for the droplets to reach at or near the eutectic temperature while in flight. On the other hand, if the droplets become too cold (colder than the eutectic temperature) as they fall through the chamber, the fresh water within each droplet could freeze together with the solid salt crystals and solid brine, in which case, it may be more difficult to separate the salt from the fresh water. This can happen, for example, when the seawater spray consists of varied droplet sizes, wherein the smaller droplets may reach below the eutectic temperature and completely freeze by the time they reach the bottom of chamber 1.

Therefore, one important aspect of the present invention is that the chamber 1, and in particular, the bottom of chamber 1, is maintained at a predetermined temperature which permits the small droplets that have been frozen at extremely cold temperatures to remain above the eutectic temperature, and therefore, form a slushy ice/brine mixture rather than a block of ice. By controlling the temperature inside the chamber 1, these ice particles can begin to collect, along with the concentrated brine, to form a wet slushy mixture containing pure ice crystals and brine.

Using these systems and methods, the following factors are preferably taken into account to ensure that the proper temperatures can be maintained inside chamber 1 and so that the proper ice particles are formed: 1) temperature of the chilled air, 2) temperature of the seawater droplets, 3) size of the droplets, 4) direction of the chilled air relative to the falling droplets, 5) velocity of the chilled air relative to the droplets, 6) time the droplets are exposed to the chilled air, which is a function of the height of the chamber, 7) the pressure within the chamber, and 8) temperature of the seawater and/or compressed air within the pipes and/or cavities surrounding the chamber walls before being introduced into chamber 1, etc.

Figure 3:
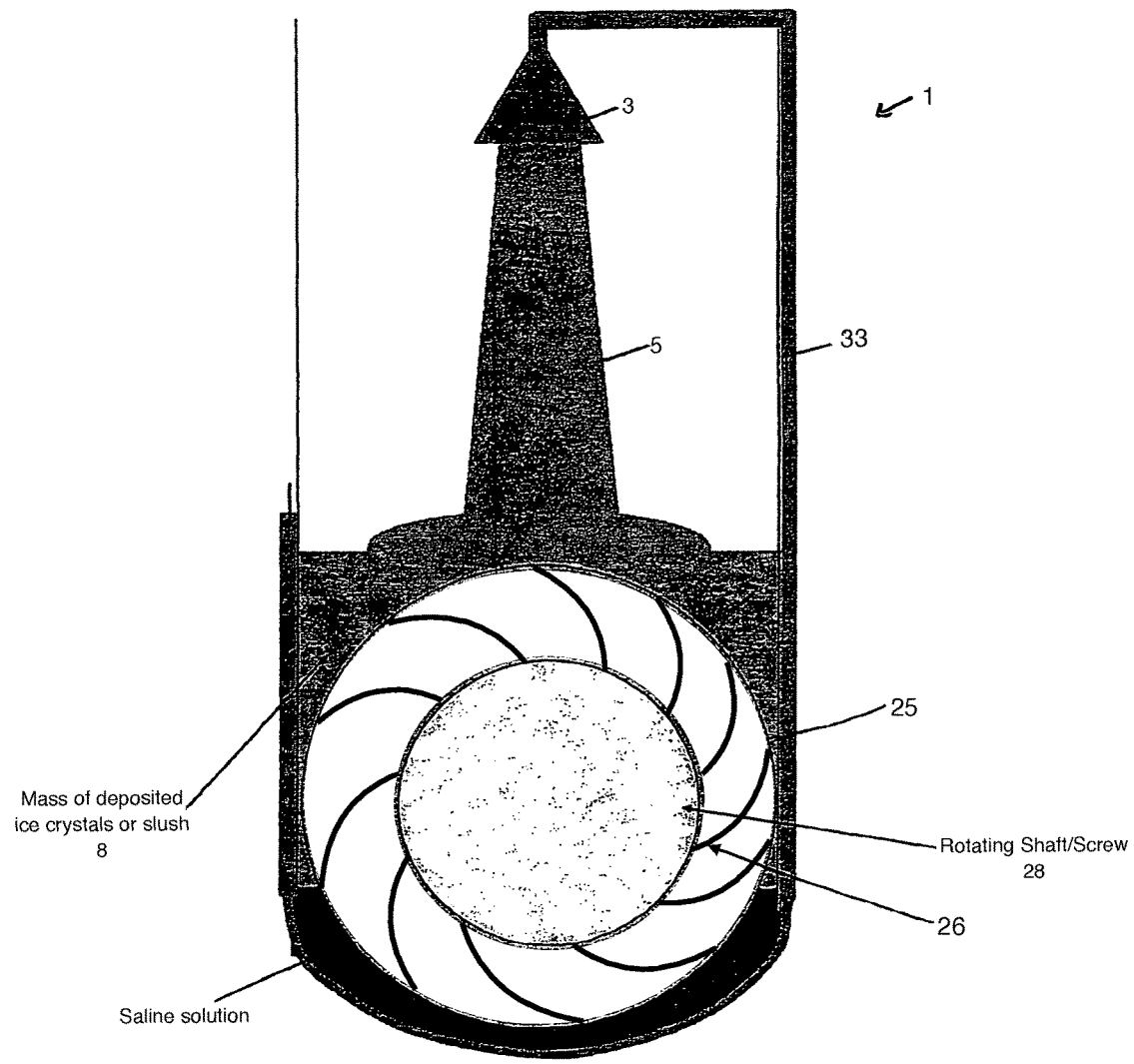
FIG. 3 is a section view of the main chamber and blade of FIG. 1 showing how the mass of deposited ice crystals and concentrated brine will form around the blade. Note that the brine drains itself down due to gravity to the bottom of the ice/slush mound.

As will be discussed, the separation of the ice particles and salt brine can occur by mixing the slushy mixture, wherein the brine can be drained by gravity away from the ice particles, and the ice particles can be removed from the brine. In this respect, the slush mixture is preferably removed from chamber 1 in the following manner:

As shown in FIG. 1, a continuous ice removal system 21 has been developed at the lower end of chamber 1 using a horizontally oriented helical screw-like blade member 23 with a cylindrical shaft 28 that can rotate and operate continuously. The blade member 23 preferably has a helical blade 26 which rotates when shaft 28 rotates, wherein blade 26 causes the ice particles that form at the bottom of chamber 1 to move laterally through a cylindrical opening 25, within the exit chamber 27, at the bottom of main chamber 1. The shape of the cylindrical opening 25 can be seen in FIG. 3. This requires the ice particles to form as more a slush, rather than as a hard ice block, so that it does not stick to blade member 23, and so that it can easily be pushed sideways, laterally toward the exit point 36, in exit chamber 27, where the ice particles can drop onto a vessel 29, or conveyor 31, and be removed from chamber 1.

To ensure that the ice particles do not collect on blade member 23, shaft 28 is preferably provided with an internal cavity and/or pipe system 31 through which incoming seawater can pass, as in the case of the crystallization chamber. This helps to keep blade member 23 relatively warm, and prevents the ice particles from collecting and sticking on blade 26 or shaft 28, and helps to regulate the temperature of the seawater without having to use extra energy. In the preferred embodiment, the seawater is initially pumped from its source into entry point 35, and then distributed through cavity or pipe system 31, within shaft 28, first through the center interior pipe 31*a*, and then through outer cavity 31*b*, and then circulated out, to pipeline 33, and into tube 13 that wraps around chamber wall 11, as discussed. This way, the heat transfer effect provided by blade member 23 can be used to augment the heat transfer effect provided by chamber walls 11.

These aspects of the invention also help to prevent the water droplets 5 and ice particles from becoming too cold, which, as discussed, can disadvantageously cause salt to freeze along with the ice. As the droplets fall within main chamber 1, i.e., from the top of the chamber 1 to the bottom, the temperature is preferably controlled and regulated in this manner, so that the seawater droplets 5 are initially exposed to temperatures well below the eutectic temperature, but are then warmed up to a level just above the eutectic temperature at the bottom of chamber 1, which allows the ice particles to properly form and separate from the liquid salt brine. The consistency of the ice particles, in this respect, is important, so that the ice is able to form properly and separate from the salt brine, and so that the ice can be easily removed from chamber 1.

One of the problems addressed by the present invention is keeping the ice/brine slush 8 moving continuously through the bottom opening 25 in exit chamber 27, while at the same time, maintaining pressure within chamber 1 to force the slush out. If pressure is added to main chamber 1, but the chamber 1 is not sealed, the air will simply pass through opening 25, and the pressure inside will not build up.

Figure 4:
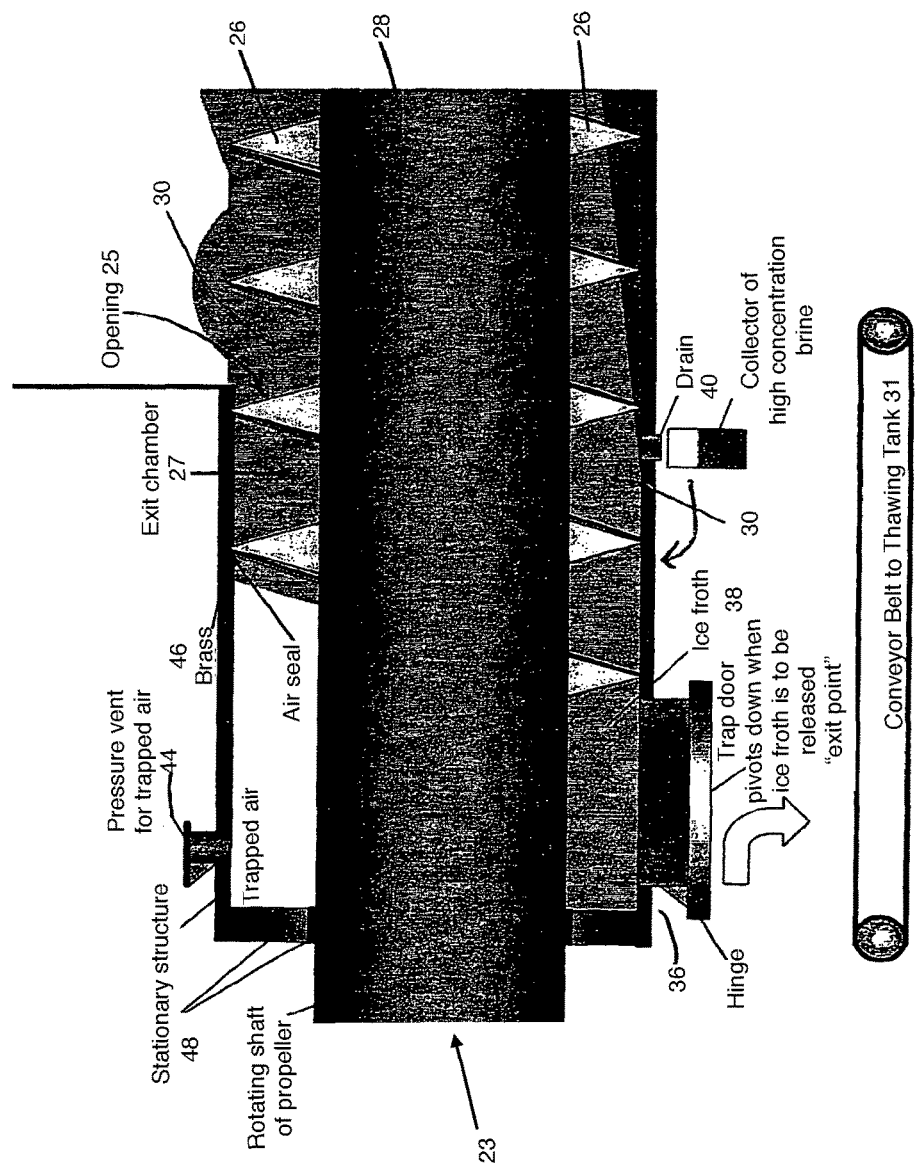
FIG. 4 shows a different start-up configuration of the continuous ice removal system of FIG. 1, with brass containment walls for the blade along the sides and at the end of the exit chamber. The walls are designed to be flush and tight-fitting with the blades along the length of the blade, to trap air within the exit chamber around the blades, and provide a solid barrier at the end of the blade. This embodiment also has a vent (at the top) that allows trapped air to escape, and a trap door (shown at the bottom) that can remain closed during the start-up phase, as will be discussed, but that can be opened after the end volume is filled. There is also a drain located downstream from the main chamber for the brine to be removed.

This problem is addressed as follows: First, the system preferably forms the slush 8 so that it is virtually air-impervious, i.e., by making it the proper consistency. That is, the slush is preferably comprised of tiny ice particles and a certain amount of liquid salt brine attached to the ice particles, to form a slush-like consistency. Also, the bottom opening 25 and exit chamber 27 are preferably sealed at the end, as shown in FIG. 4, and the inside surface of opening 25 and exit chamber 27 are preferably made of brass and configured so that they are relatively flush and tight-fitting with the external edges of blade 26. That way, as slush 8 is forced laterally through exit chamber 27, by the action of blade 26, and air pressure within crystallization chamber 1 is increased, slush 8 will begin to fill the annulus volume, including voids or gaps 30, existing within blade 26. This way, as slush 8 is passed through exit chamber 27, slush 8 can seal the opening 25, and prevent the venting of pressurized air through exit point 36, even when exit point 36 is opened (to allow the ice particles to be removed from exit chamber 27). Any excess trapped air ahead of slush 8 can be vented via vent 44 located at the distal end of exit chamber 27, which helps to allow the slush to move toward exit point 36.

It can be seen that pressure is preferably introduced into main chamber 1, to force slush 8 into the voids or gaps 30 that exist within blade member 23. Accordingly, exit chamber 27 is preferably sealed around the edges, which can be accomplished by using containment walls, such as made of brass, that are flush and tight-fitting with the external shape of blade 26, and by sealing the distal end 48 of exit chamber 27, as shown in FIG. 4. That way, by filling the voids or gaps 30, within blade member 23, the opening 25 can effectively be sealed, without preventing the slush 8 from passing through exit point 36.

An additional problem addressed by the present invention relates to the start up phase, when the slush 8 has yet to fill the voids or gaps 30 within the blade 26 completely, and pressure is needed to fill the voids or gaps 30 therein. This problem is addressed with a start-up configuration, as shown in FIG. 4, which includes 1) additional brass containment walls that are stationary and located at the distal end of blade member 23, to seal the end of exit chamber 27, 2) a trap door 38 with a pivoting door provided at exit point 36 within exit chamber 27, through which the ice particles can pass, and 3) a pressure triggered air vent 44 located at the distal end of exit chamber 27.

When the system is initially turned on, the trap door 36 can be closed, such that pressure inside the chamber 1 can be increased and maintained, but a small amount of air is preferably vented through vent 44, sufficient to avoid trapping air ahead of slush 8, which enables the slush 8 to begin moving and filling the voids or gaps 30 within blade member 23. Then, once slush 8 has filled the voids and gaps 30, i.e. to create an air-impervious barrier around opening 25, the trap door 38 can be opened which allows the ice particles to start flowing out of exit chamber 27, i.e., through the exit point 36, while at the same time, the slush 8 remains enveloped around blade member 23 within opening 25, to seal the voids and gaps 30 therein. The slush 8 preferably prevents the passage of air through opening 25, while at the same time, it is able to move laterally downstream through exit chamber 27 toward exit point 36, where the ice particles can drop down into an ice crystal collection vessel 29, or conveyor 31, so that it can be removed and allowed to melt.

Note: At the start of operation, chilled air is circulated throughout main chamber 1 and side centrifuge chamber 42, shown in FIG. 1, as well as blade member 23, prior to the flow of seawater into the system in order to bring the containment structures to their cold steady state temperature prior to the flow of seawater into the containment structures. Vent 44 at the end of exit chamber 27 can be driven open by pressure within the main 1 and side 42 chambers. For example, the vent can be set at about 13-psig (27.67 psia) as 30-psia air is entered into the two chambers. After the seawater enters the main chamber and the slush 8 forms and starts to move along the blade member 23, the outflow of air becomes progressively restricted by the slush 8 filling the blade annulus volume and vent 44 closes. The trapped air ahead of the moving slush 8 vents when its pressure exceeds a predetermined amount, which can be set to about 13-psig. After all the trapped air is bled by vent 44, and the slush 8 is allowed to advance, the steady state flow of slush 8 is allowed to proceed by opening trap door 38.

Note that the 13.00-psig (27.67-psia) vent would open when the airflow attained 30 psia (15.3 psig) pressure, because 30-psia>27.67-psia. The flow of chilled air over blade member 23 and out of vent 44 preferably permits the blade surface to be chilled to near the steady state cold temperature required for later operation. The trap door 38 preferably remains closed until slush 8 starts to arrive at trap door 38. As slush 8 starts to collect on blade member 23, the flow of air would still continue out of vent 44. However, there is a point in time wherein the slush buildup in the volume isolates the closed volume from the 30-psia in the crystallization chamber 1 and the vent valve 44 closes. The closure of the 13.00-psig vent valve preferably signals the bottom trap door 38 to swing open and permit the outflow of ice crystals through exit point 36.

Figure 2:
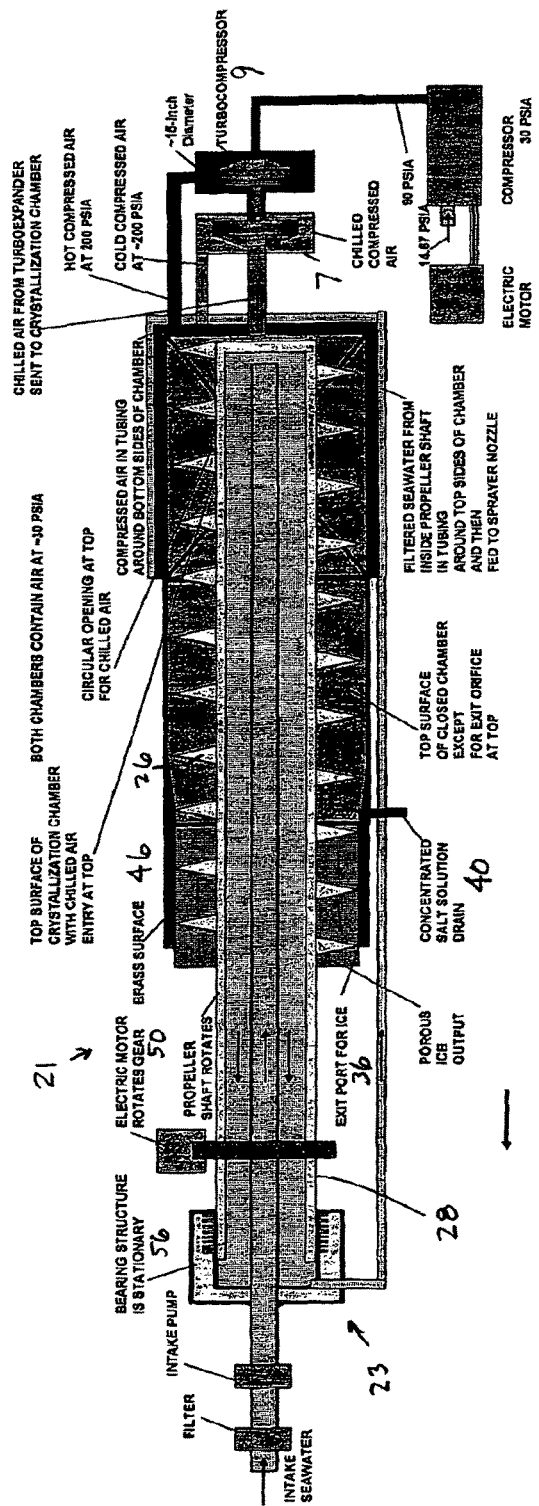
FIG. 2 is a section top view of the continuous ice removal system of FIG. 1, showing the turbo compressor which feeds heated compressed air through pipes extending around the main chamber, such as those shown in FIG. 5.

In one embodiment, as shown in FIG. 2, at the start, the 90 psia from the pneumatic source feeding the turbo compressor 9 preferably bleeds through as almost 90 psia to initiate the turbo expander rotation. The turbo expander 7 rotates slowly at the outset and exhausts air that is only slightly cooled and certainly pressurized. The accelerating rotation of the turbo expander 7 also accelerates the turbo compressor 9 via their common shaft. The accelerating turbo compressor 9 creates higher and higher feed pressures to the turbo expander 7 until steady state is achieved that feeds 200-psia to the turbo expander 7 and 30-psia is fed to the crystallization chamber 1.

In the crystallization chamber 1 there is preferably no seawater feed through nozzle 3 and no rotation of blade member 23 until turbo expander 7 and turbo compressor 9 reach this steady state, and the chilled air has filled the closed volume around blade member 23 and is exhausting out of the centrifuge chamber with 30-psia in crystallization chamber 1. Turning the seawater pump on activates the spray nozzle 3, wherein the seawater passes through (1) the coarse filter for removing larger particulates and any suspended neutral-density oil, and (2) the fine filter for removing fine particles. It then preferably circulates through blade member 23 and tubing 13 around crystallization chamber 1, before it is fed to spray nozzle 3. The intake of the seawater is preferably below the surface of the sea or ocean to avoid intake of any floating oil.

At the same time that the spray nozzle 3 is turned on, the motor for blade member 23 is preferably turned on. As shown in FIGS. 1 and 2, there is preferably a motor driven gear 50 that drives and rotates shaft 28. Additional thrust bearings 52, 54, in both vertical and horizontal directions, are also preferably provided to maintain the blade member 23 in a substantially fixed position, while allowing it to rotate. These bearings help account for the various movements, as well as the contraction and expansion of the steel from which blade member 23 is constructed. At the distal end of shaft 28, there is preferably a series of bearings 56, which can be made of rollers or brass plates, etc., which also help to keep shaft 28 in its proper alignment and orientation relative to chamber 1. The action of blade member 23 is to stir the ice particles so that separation is encouraged and metastable states attain their equilibrium phases.

As best seen in FIG. 5, but also shown in FIG. 1, a side chamber 42 is preferably provided next to main chamber 1, with an opening 43 near the bottom through which the chilled air in main chamber 1 can exit. This preferably causes the chilled air to "turn the corner" at the bottom of main chamber 1, as shown in FIG. 1, such that the air travel sideways, and then passes upward through the side chamber 42, and out. Relatively large droplets can be deposited at the bottom of main chamber 1, but because there are small droplets (less than 20 microns in diameter) that are contained in the air stream that might otherwise blow through the main chamber and into the side chamber 42, there is preferably imposed a U-turn in the air stream at opening 43. This U-turn preferably causes the small frozen droplets to be forced down from the air stream and deposited onto the exiting slush 8 at the bottom of main chamber 1. This also helps to push more of the slush 8 down and laterally toward opening 25, and helps prevent the air stream from interfering with the falling droplets.

As blade member 23 rotates, and slush 8 moves laterally through opening 25, the salt brine preferably begins to separate from the ice particles, and, as shown in FIG. 1, is allowed to collect and flow down drain 40 located at the bottom of exit chamber 27 preferably downstream from main chamber opening 25. During this process, the ice particles are formed and composed of pure water, whereas the salt brine, which can contain about 23% salt and 77% water, remains liquid so that it can separate from the ice and flow through the ice particles and down drain 40. This helps to ensure that pure water can be separated from the salt water. Minerals and salts can be extracted from the brine, if desired.

Blade member 23 tends to break up the ice formation and facilitates the drainage of the brine solution. The stirring action of blade 26 also facilitates the rapid conversion of any metastable compounds to become an equilibrium mixture of solid ice and liquid brine. It is important to maintain the exiting slush 8 at slightly warmer than the eutectic temperature to assure that the brine phase does not freeze and form an ice configuration that cannot be separated from the "pure water" ice.

It is also significant to note that the brine drain 40 is preferably located downstream from main chamber 1, within exit chamber 27, past main chamber opening 25. This helps to ensure that the liquid brine does not separate from and drain out of slush 8 pre-maturely, but is allowed to mix and remain part of the slush near the main chamber opening 25, where the slush 8 remains in the mixture to help seal opening 25. This way, the slush 8 will continue to help seal opening 25 at the bottom of main chamber 1 before the liquid brine is allowed to drain out.

In this respect, note that if the drain were to be located in the center of main chamber 1, for example, the salt brine would likely separate and drain down into the middle of chamber 1, which would probably cause slush 8 to lose its liquid consistency before it has a chance to fill the voids or gaps 30 around blade 26. This could result in tiny air pockets being formed in the mixture pre-maturely, which could allow air to pass through opening 25, and cause chamber 1 to lose pressure.

As blade member 23 continues to move slush 8 through exit chamber 27 and toward exit point 36, and more and more of the salt brine is drained from slush 8, the slush mixture preferably begins to consist of mostly pure ice particles, along with a few tiny air pockets and bubbles where the salt brine used to be. That is, even though the slush remains "wet" because of the liquid brine that coats each ice crystal, as the slush passes through the opening 25, and the liquid brine begins to separate and drop down through drain 40, the slush mixture 8 in the exit chamber 27 then becomes more dry, i.e., consisting of less brine by the time it reaches exit point 36.

Because drain 40 is downstream from main chamber 1, the slush 8 preferably stays "wet" when it passes through opening 25, so that the seal can be made, i.e., the seal is not affected by the draining of the brine solution. However, by the time slush 8 moves all the way to exit point 36, the mixture is preferably mostly "dry," with little or no liquid salt brine mixed in with the ice particles. Even though the ice particles at exit point 36 may contain some tiny air pockets and bubbles, this does not affect the seal around opening 25, which is upstream from exit point 36.

At this point, as the ice particles are pushed by blade member 23 through exit chamber 27, the ice particles are allowed to drop down through exit point 36 where the trap door 38 is located, either into an ice collection vessel 29, or onto a conveyor 31, which transports the ice particles to where it can be melted to form pure water.

The mass of ice particles which is removed can be melted, to produce fresh water at the bottom of a holding tank. Fresh water at relatively warm temperatures, in this case, at about plus 15 degrees C., can be sprayed down like a wash column onto the ice particles, to rinse the ice, and cause the ice to melt. Alternatively, or in conjunction with the rinse water, local warm air can be brought into the holding tank, to further assist in melting the ice particles, to form chilled fresh drinking water. Other means of removing and melting the ice can be provided.

Because the ice mass is made of ice, and therefore, is cold, the fresh water that is produced when it melts will be chilled water. From there, the fresh chilled water can be distributed for drinking purposes, or used for other purposes, such as being stored for later use by the air conditioning system.

We claim:

1. A system for desalinating seawater and continuously removing ice comprising:
   a. a compressor for compressing air;
   b. an expander for expanding compressed air to co-generate chilled air;
   c. a chamber with at least one nozzle through which the seawater can be sprayed as droplets into the chamber, and into which the chilled air from the expander can be introduced, wherein the exposure of the seawater to the chilled air enables ice particles consisting of pure water to be formed therein; and
   d. a rotatable blade member on a shaft extending laterally through a laterally extended exit chamber located at the bottom of the chamber that helps to remove the ice particles from the chamber, thereby helping to separate the pure water in the ice particles from the impurities in the seawater, wherein the exit chamber is substantially sealed such that pressure inside the chamber can be increased before the system is activated, wherein the temperature of the chilled air introduced into the chamber is below the eutectic temperature for the seawater, wherein the ice particles are allowed to deposit at the bottom of the chamber in the form of a slush, wherein the temperature of the slush at the bottom of the chamber is above the eutectic temperature for the seawater, wherein the slush prevents airflow throughout the chamber, and wherein the slush increases pressure within the chamber.

2. The system of claim 1, wherein the blade member comprises a helical screw-like member that extends laterally from the bottom of the chamber outward, through the exit chamber, wherein the blade member has a uniform diameter that extends substantially flush with an internal cylindrical surface of the exit chamber.

3. The system of claim 2, wherein a drain is provided along the bottom of the exit chamber downstream from the chamber.

4. The system of claim 3, wherein an exit point comprising a means for allowing the ice particles to be removed from the exit chamber is provided further downstream within the exit chamber from the drain.

5. The system of claim 4, wherein said means comprises a trap door that swings down to allow the ice particles to be dropped down below the exit chamber.

6. The system of claim 5, wherein the exit chamber is substantially sealed such that pressure inside the chamber can be increased before the system is activated.

7. The system of claim 6, wherein a vent is provided at the distal end of the exit chamber to allow a portion of the pressure inside the chamber to be released, and at least a portion of the internal surface of the exit chamber is made of brass.

8. The system of claim 1, wherein a side chamber is provided adjacent said chamber which allows the chilled air to circulate out of the chamber, while still allowing circulating air outside the main chamber to form ice crystals which fall at the bottom of the chamber.

9. The system of claim 8, wherein the side chamber extends in the same direction as the exit chamber, such that the ice particles dropping down in the side chamber will be deposited onto the blade member.

10. The system of claim 1, wherein the walls of the chamber are adapted with at least one tube or cavity which allows the seawater to be circulated therein, to help regulate temperature of the walls within the chamber, and to help cool the seawater.

11. The system of claim 1, wherein the walls of the chamber are adapted with at least one tube or cavity which allows heated air from the compressor to be used to regulate the temperature of the walls within the chamber, the cold temperature inside the chamber can help pre-chill the heated air as it circulated to the expander.

12. The system of claim 1, wherein the blade member is adapted with at least one pipe or cavity therein which allows seawater to circulated therein, to help regulate a temperature of the blade member, and to help cool the seawater.

13. The system of claim 1, wherein the system comprises at least one of the following:
   a. the system is adapted such that the seawater can be sprayed down into the chamber from above, and the chilled air can be introduced such that the air flows upward inside the chamber;
   b. the system is adapted such that the seawater can be sprayed down into the chamber from above, and the chilled air can be introduced such that the air flows downward inside the chamber in the same direction as the seawater.

14. A method of desalinating seawater comprising:
   a. compressing air to produce compressed air energy;
   b. releasing the compressed air with an expander to co-generate chilled air;
   c. introducing the chilled air into a chamber, wherein the chamber is substantially sealed such that pressure inside the chamber can be increased before the system is activated;
   d. spraying the seawater with at least one nozzle in the form of droplets into the chamber;
   e. exposing the seawater droplets to the chilled air within the chamber, wherein the temperature of the chilled air introduced into the chamber is below the eutectic temperature for the seawater, thereby forming ice particles consisting of pure water, and allowing them to drop down into the bottom of the chamber;
   f. the ice particles forming slush, wherein the ice particles are allowed to deposit at the bottom of the chamber in the form of a slush,
   g. the slush preventing airflow throughout the chamber, wherein the slush increases pressure within the chamber
   h. operating a rotatable helical screw-like blade member on a shaft extending laterally through a laterally extended exit chamber located at the bottom of the chamber to remove the ice particles from the chamber, thereby helping to separate the pure water in the ice particles from the impurities in the seawater.

15. The method of claim 14, wherein the blade member extends substantially flush with an internal cylindrical surface of the exit chamber, and the exit chamber is substantially sealed such that pressure inside the chamber can be increased before the system is activated, wherein before the blade member and nozzle are activated, the chamber is substantially sealed and chilled air is allowed to decrease the temperature of the chamber to a steady state predetermined temperature.

16. The method of claim 15, wherein a vent is provided at the distal end of the exit chamber to allow a portion of the pressure inside the chamber to be released, and wherein after the system is activated, the vent is allowed to open slightly to allow the slush mixture to travel longitudinally along the exit chamber, by action of the blade member.

17. The method of claim 16, wherein as the slush mixture begins to fill the blade member annulus at the bottom of the chamber, the slush mixture substantially provides an air impervious layer that helps to maintain the pressure inside the chamber, while at the same time, allowing the slush mixture to be forced laterally outward along the exit chamber.

18. The method of claim 17, wherein as the blade member is rotated, and the slush is mixed, the liquid brine is substantially drained through a drain provided along the bottom of the exit chamber downstream from the chamber.

19. The method of claim 18, wherein as the blade member is rotated, the slush containing the ice particles is moved laterally further downstream beyond the drain, and is allowed to drop down through an exit point such that the slush can be removed from the exit chamber.

20. The method of claim 14, wherein a side chamber is provided adjacent said chamber, and the chilled air in the chamber is allowed to circulate out of the chamber through the side chamber, while at the same time, smaller ice particles in the chamber are allowed to be deposited to the bottom of the chamber.

21. The method of claim 14, wherein the method comprises introducing the chilled air at below the eutectic temperature for the seawater, and keeping an ice/brine slush mixture at the bottom of the chamber at above the eutectic temperature.

22. The method of claim 14, comprising at least one of the following steps:
 a. spraying the seawater down into the chamber from above, and introducing the chilled air such that it flows upward inside the chamber;
 b. spraying the seawater down into the chamber from above, and introducing the chilled air such that it flows downward in the same direction as the seawater being sprayed into the chamber.

23. The method of claim 14, wherein the method comprises circulating the seawater through at least one tube or cavity within the chamber walls and/or blade to help warm up the chamber walls and/or blade, and in turn, cause the cold temperature inside the chamber and/or blade to help pre-chill the seawater before the sea water is sprayed into the chamber.

24. The method of claim 14, wherein the method comprises circulating heated air from the compressor through at least one tube or cavity in the chamber walls to help warm up the chamber walls, wherein the cold temperatures inside the chamber can help pre-chill the heated air as air circulates to the expander.

* * * * *